2 Sheets—Sheet 1.
C. S. PIERSONS,
Assignor, by mesne assignments, to himself, J. A. OBER & C. FERRIS.
Harness.
No. 9,187. Reissued May 4, 1880.
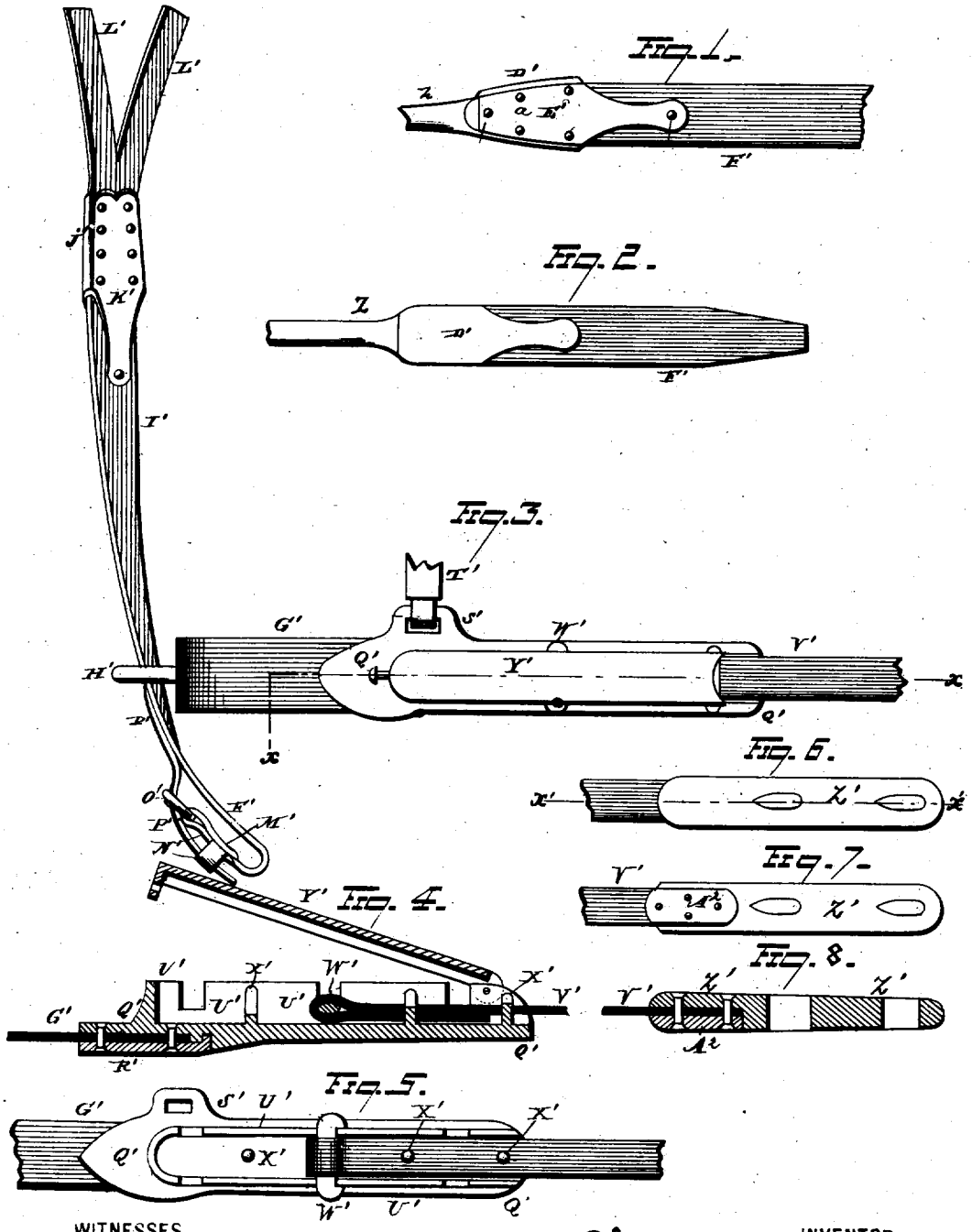
WITNESSES
E. J. Nottingham
D. McCleary
INVENTOR
Charles S. Piersons.
By H. A. Seymour.
ATTORNEY
N. PETERS, PHOTO-LITHOGRAPHER, WASHINGTON, D. C.

2 Sheets—Sheet 2.
C. S. PIERSONS,
Assignor, by mesne assignments, to himself, J. A. OBER & C. FERRIS.
Harness.
No. 9,187. Reissued May 4, 1880.
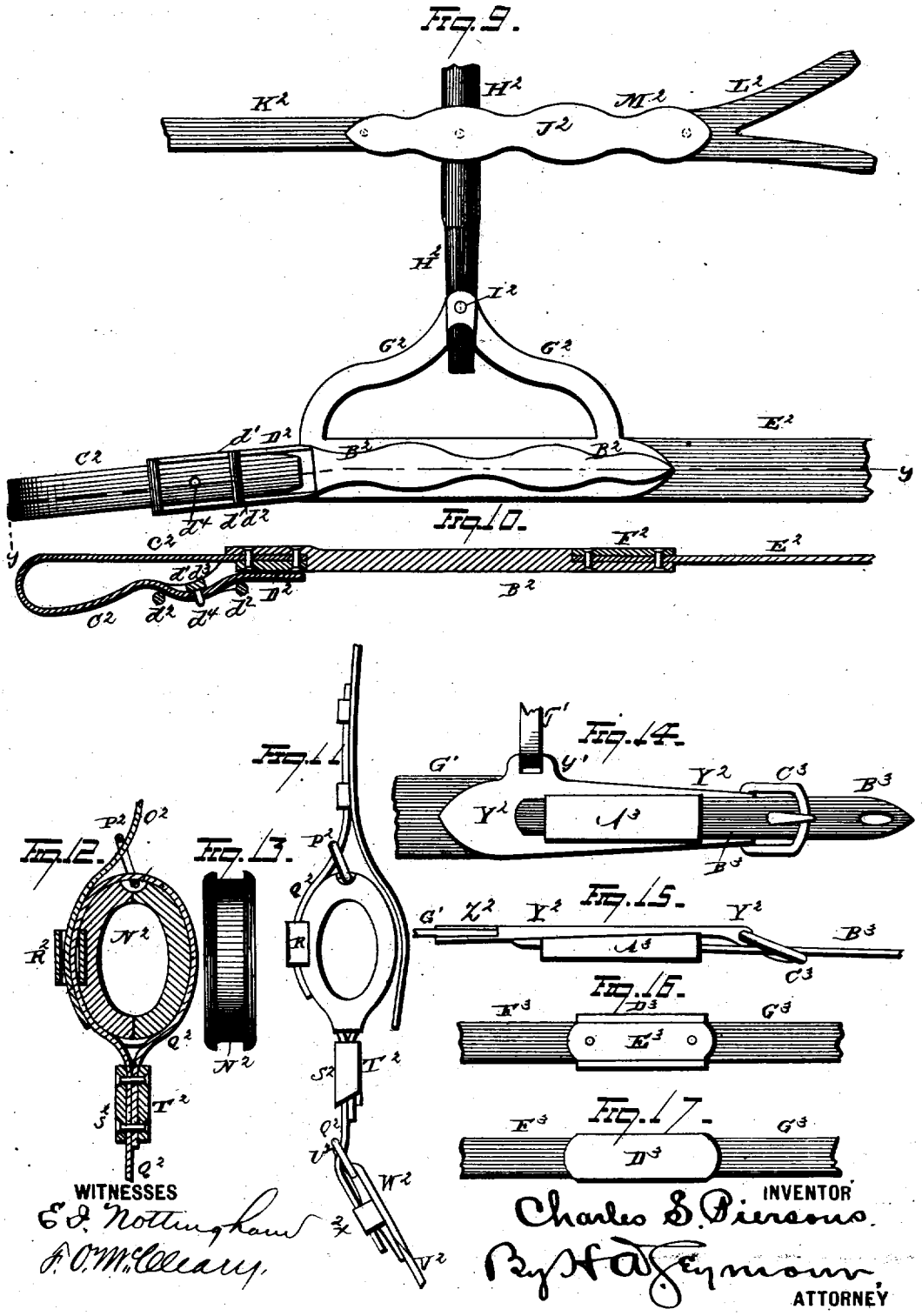
WITNESSES
E. S. Nottingham
F. O. McCleary
INVENTOR
Charles S. Piersons
By H. A. Seymour
ATTORNEY
H. PETERS, PHOTO-LITHOGRAPHER, WASHINGTON, D. C.

UNITED STATES PATENT OFFICE.

CHARLES S. PIERSONS, OF SANDY HILL, NEW YORK, ASSIGNOR, BY MESNE ASSIGNMENTS, TO HIMSELF, JOSEPH A. OBER, AND CHARLES FERRIS.

HARNESS.

SPECIFICATION forming part of Reissued Letters Patent No. 9,187, dated May 4, 1880.

Original No. 213,246, dated March 11, 1879. Application for reissue filed December 2, 1879.

*To all whom it may concern:*

Be it known that I, CHARLES S. PIERSONS, of Sandy Hill, in the county of Washington and State of New York, have invented certain new and useful Improvements in Harness; and I do hereby declare the following to be a full, clear, and exact description of the invention, such as will enable others skilled in the art to which it pertains to make and use it, reference being had to the accompanying drawings, which form part of this specification.

Figure 1, Sheet 1, is a detail view of the inner side of the rein-coupling. Fig. 2, Sheet 1, is a detail view of the outer side of the rein-coupling. Fig. 3, Sheet 1, is a side view of the breast-collar, showing the martingale-coupling in perspective. Fig. 4, Sheet 1, is a longitudinal section of the breast-collar coupling, taken through the line *x x*, Fig. 3. Fig. 5, Sheet 1, is a detail view of the same, the cover being removed. Fig. 6, Sheet 1, is a detail view of the outer side of the tug-eye plate. Fig. 7, Sheet 1, is a detail view of the inner side of the same. Fig. 8, Sheet 1, is a longitudinal section of the same, taken through the line *x′ x′*, Fig. 6. Fig. 9, Sheet 2, is a face view of the breeching and back-strap pieces. Fig. 10, Sheet 2, is a longitudinal section of the breeching-piece, taken through the line *y y*, Fig. 9. Fig. 11, Sheet 2, is a side view of the thill-carrier. Fig. 12, Sheet 2, is a longitudinal section of the same. Fig. 13, Sheet 2, is an edge view of the thill-carrier ring. Fig. 14, Sheet 2, is a face view of a modified form of a breast-collar coupling. Fig. 15, Sheet 2, is an edge view of the same. Fig. 16, Sheet 2, is a view of the inner side of a strap-coupling. Fig. 17, Sheet 2, is a view of the outer side of the same.

The object of this invention is to furnish a harness which shall be stronger, more durable, lighter, and neater in appearance, and less expensive in manufacture than ordinary harness, requiring less stock and less labor in its construction.

The invention will be first described in connection with the drawings, and then pointed out in the claims.

In the drawings, D′ E′ is the coupling or piece that connects the rein Z with the hand-piece F′. The top plate, D′, is made with flanges upon the side edges of its inner surface, to form a groove to receive the ends of the rein Z and the hand-piece F′ and the bottom plate, E′. The parts D′ E′ are secured together, clamping the rein Z and the hand-piece F′ between them, by rivets cast upon the inner surface of the plate D′ and passing through and headed down into reamed holes in the clamping-plate E′. The ends of the rein Z and the hand-piece F′ are further secured in place by pins cast upon the inner surface of the plate D′, and which pass through the said ends.

G′ is the breast-strap of the collar, to the middle part of which are riveted the ends of the loop or keeper H′, through which the martingale I′ passes.

J′ K′ are the two parts of a coupling for connecting the martingale I′ with its ring-straps L′. The part or plate J′ is cast with flanges upon its side edges and with pins and rivets upon its inner surface, for securing the ends of the straps I′ L′ and the clamping-plate K′, in the manner hereinbefore described.

To the lower end of the martingale I′ is attached a buckle-holder, M′, which is cast in one piece, bent together in the middle, and made with a notch to receive the loop N′, with cross-flanges upon its middle part, to form a recess to receive the tongue-bar of the buckle O′, into which the billet P′ is buckled.

The ends of the holder M′ are connected together, clamping the end of the martingale I′ between them, by a rivet.

To the end of the breast-strap G′ is secured the plate Q′, which has a recess formed in the inner side of its forward end to receive the end of the breast-strap G′ and the plate R′, by which it is secured in place.

The clamping-plate R′ is secured by rivets cast upon the plate Q′ and by flanges formed upon the inner surface of its inner end, and which are notched to interlock with a flange or rib formed upon the plate Q′ at the inner end of its recess. Upon the upper edge of the forward end of the plate Q′ is cast a loop, S′, to receive the neck-strap T′. Upon the outer side of the plate Q′ are cast flanges U′, to form a recess or open box to receive the forward end of the tug V′. In the forward end of the tug V′ is formed a loop to receive the key W′, which key is dropped into notches in the flanges U′.

Several sets of notches are formed in the flanges U′ to receive the key W′, so that the tug V′ can be lengthened and shortened as desired by moving the said key W′ from one set to another of the said notches.

The tug V′ is further secured by pins X′, cast upon the plate Q′, and which pass through holes in the said tug V′.

Y′ is the top plate or cover, which has flanges formed upon the edges of its sides and forward ends to overlap the flanges U′ of the plate Q′. The cover Y′ is hinged at its rear end to the rear ends of the flanges U′, and its forward end is secured, when closed, by a pin, spring-catch, or other convenient fastening.

To the rear end of the tug V′ is attached the plate Z′, which has one or more holes or eyes formed in it to receive the eye or hook of the whiffletree. In the inner side of the forward end of the plate Z′ is formed a recess to receive the end of the tug V′ and the clamping-plate $A^2$, which are secured in place by pins and rivets in the manner hereinbefore described.

$B^2$ is the breeching-plate, the outer side of the forward end of which is recessed to receive the end of the side strap, $C^2$, and the plate $D^2$. The plate $D^2$ is secured in place by rivets, and has flanges formed upon its side edges to hold the strap $C^2$ against side movement, and its rear end is halved to the plate $B^2$ to give the connection greater strength. The forward part of the clamping-plate $D^2$ has arms $d'$ formed upon it, which are curved outward, forward, and inward, have cross-bars $d^2$ formed upon the upper side of their ends, and a cross-bar, $d^3$, formed upon the lower side of their centers.

Upon the center of the cross-bar $d^3$ is formed an outwardly-projecting pin, $d^4$, which passes through a hole in the free end of the side strap, $C^2$, the said strap passing beneath the two cross-bars $d^2$, the said cross-bars serving as loops or keepers.

The inner side of the plate $B^2$ is recessed to receive the end of the breeching-strap $E^2$ and the clamping-plate $F^2$, which are secured in place by pins, rivets, and interlocking flanges in the manner hereinbefore described.

Upon the end parts of the upper edge of the breech-plate $B^2$ are formed the ends of a brace, $G^2$, the center of which projects upward at an angle and has flanges formed upon the opposite side edges of the said angle to form a recess to receive the end of the hip-strap $H^2$ and the clamping-plate $I^2$.

Upon the angle of the brace $G^2$, in the center of its recess, is formed a pin, which passes through the hip-strap $H^2$, and has a screw-hole formed in its end to receive the screw that secures the clamping-plate $I^2$ in place detachably.

$J^2$ is a plate, which has a recess formed in the under side of its forward end to receive the rear end of the back-strap $K^2$, a recess formed in the under side of its rear end to receive the forward end of the crupper-strap $L^2$, and a notch formed across the under surface of its forward part to receive the hip-strap $H^2$. The straps $K^2$ $L^2$ $H^2$ are secured in place by the clamping-plate $M^2$, riveted to its under side.

The hip-strap $H^2$ is kept from longitudinal movement between the plates $J^2$ $M^2$ by a pin cast upon the said plate $J^2$, and which passes through the said strap $H^2$.

$N^2$ is the thill-carrier, which is made in two parts or halves locked together at their ends. Around the outer surface of the carrier is formed a groove to receive the carrier-strap $O^2$.

In the top of the carrier $N^2$ is formed a notch to receive the tongue-bar of the buckle $P^2$, into which is buckled the billet $Q^2$, extending down from the saddle-tree to support the thill. In the outer side of the carrier $N^2$ is formed a wide notch to receive the loop $R^2$ for the end of the billet $Q^2$. The buckle $P^2$ and the loop $R^2$ are held in place by the carrier-strap $Q^2$. The ends of the carrier-strap $Q^2$ are brought together at the lower side of the carrier, and are fastened by the plates $S^2$ $T^2$. The outer plate, $S^2$, has flanges upon its side edges to form a recess to receive the ends of the strap $Q^2$ and the clamping-plate $T^2$, and has rivets cast upon its inner surface, by which the said plates $S^2$ $T^2$ and the ends of the strap $Q^2$ are fastened together.

The outer end of the strap $Q^2$ is made sufficiently long to serve as a billet to receive the buckle $U^2$ of the belly-band $V^2$. The buckle $U^2$ is secured to the belly-band $V^2$ by a holder, $W^2$, which is made in the same manner as the buckle-holders hereinbefore described, and is provided in the same way with a loop, $X^2$, to receive the billet $Q^2$.

$Y^2$ represents a modified form of the breast-strap plate, which is made in the same manner as a buckle-holder, except that it is provided with an eye, $y'$, at the forward part of its upper edge, to receive the neck-strap T′ and a clamping-plate, $Z^2$, for securing the end of the breast-strap G′. The strap G′ and the clamping-plate $Z^2$ are secured in the recess in the plate $Y^2$ by pins, rivets, and interlocked flanges in the manner hereinbefore described. In this case the plate $Y^2$ is provided with a long loop, $A^3$, to receive the end of the tug $B^3$, which is buckled into the buckle $C^3$, held by the said plate $Y^2$.

$D^3$ $E^3$ is a coupling for connecting the ends of two flanges, $F^3$ $G^3$, and which is formed of two plates. The outer plate, $D^3$, has flanges along its side edges to form a recess to receive the ends of the straps $F^3$ $G^3$ and the inner or clamping plate, $E^2$.

The plates $D^3$ $E^3$ and the straps $F^3$ $G^3$ are secured to each other by rivets cast upon the inner surface of the said plate $D^3$, and which pass through the said plate and straps $E^3$ $F^3$ $G^2$.

Having fully described my invention, what I claim as new, and desire to secure by Letters Patent, is—

1. As an improvement in harness, the combination, with top plate, D′, formed with side flanges upon the edges of its inner surface, of rein Z, hand-piece F′, and bottom plate, E′, the three latter parts being fitted and secured by rivets in the recess formed by the flanges, the ends of the rein and hand-piece being further secured in place by pins cast upon the inner surface of plate D′, substantially as set forth.

2. As an improvement in harness, the breast-plate Q′, having notched lateral projection U′, which extends about the side and front end portions thereof, pins X′, hinged cover Y′, loose key W′, and clamping-plate R′, said parts being adapted to receive and hold the breast-strap G′ and the tug V′, substantially as set forth.

3. As an improvement in harness, the breast-plate Q′, provided with lateral projection U′, which extends about the side and front end portions thereof, and forms an inclosure for the tug, said lateral projection being provided with notches, and the inclosed portion of the plate being provided with pins cast thereon, substantially as set forth.

4. As an improvement in harness, the breeching-piece formed of the plate $B^2$, recessed at both ends, clamping-plates $D^2$ and $F^2$, and devices for securing the ends of the strap between the plate $B^2$ and the clamping-plates, substantially as set forth.

5. As an improvement in harness, the breeching-piece formed of the plate $B^2$, recessed at both ends, clamping-plates $D^2$ $F^2$, and rivets or pins, cross-bars $d^2$ $d^3$, pin $d^4$, and brace $G^2$, substantially as set forth.

6. As an improvement in harness, the carrier $N^2$, made in two parts and provided with notches to receive the buckle $P^2$ and loop $R^2$, and a groove to receive the strap $Q^2$, the plate $S^2$, provided with flanges along its side edges, and the clamping-plate $T^2$, substantially as set forth.

7. As an improvement in harness, the tug-eye plate Z′, provided with eyes to receive the eye or hook of the whiffletree, and with a recess to receive the end of the tug, and the clamping-plate $A^2$, substantially as set forth.

In testimony that I claim the foregoing I have hereunto set my hand this 27th day of October, 1879.

CHARLES SYLVESTER PIERSONS.

Witnesses:
M. S. CRONKHITE,
C. H. SMITH.